BEST AVAILABLE COPY

DEFENSIVE PUBLICATION

T903,027

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 373

T903,027

BACTERIA-INHIBITING URETHANE FOAMS

Robert L. McBrayer, Lincoln Park, Mich. (% BASF Wyandotte Corporation, Wyandotte, Mich. 48192)

Continuation-in-part of application Ser. No. 653,672, July 17, 1967. This application Apr. 26, 1971, Ser. No. 137,579

Int. Cl. C08g *22/44*
U.S. Cl. 260—2.5 AI
No Drawing. 11 Pages Specification

The inhibition of the growth of bacteria and fungi in polyurethane foam by the inclusion of the condensation product of 10,10′-oxybisphenoxarsine and epoxidized soy bean oil having a flash point of about 600° F., a specific gravity of about 1 at 20/20° C., and a molecular weight of about 1000 in the polyurethane foam formulation.